ately. Several thermal shock devices have been evaluated. The bending bars from Examples 1 and 2 were placed in a hot zone having a temperature of about 1000° C. for 15 minutes, then removed and plunged into water at 20° C. The samples were then dried and tested for modulus of rupture. The MOR values were not changed significantly by the thermal shock treatment.

I claim:
1. A method for producing a polycrystalline cordierite body which comprises (a) mixing particles of talc, clay and alumina in a ratio to produce a substantially stoichiometric cordierite, (b) pelletizing the resulting mixture, (c) sintering the resulting pellets to produce cordierite, (d) milling the resulting pellets in non-contaminating media to produce a powder having a particle size of from about 1 to about 10 microns, (e) consolidating the resulting powder, and (f) sintering the resulting consolidated powder to produce a polycrystalline cordierite body.# United States Patent [19]

Cleveland

[11] 4,235,855

[45] Nov. 25, 1980

[54] METHOD FOR PRODUCING HIGH STRENGTH LOW EXPANSION CORDIERITE BODIES

[75] Inventor: Joseph J. Cleveland, Dushore, Pa.

[73] Assignee: GTE Products Corporation, Stamford, Conn.

[21] Appl. No.: 966,932

[22] Filed: Dec. 6, 1978

[51] Int. Cl.$^3$ .................. C01B 33/22; C04B 35/04
[52] U.S. Cl. .................. 423/327; 106/62; 264/66
[58] Field of Search ............ 423/327, 328; 106/62, 106/73.4, 36.9; 264/56, 63, 66

[56] References Cited

U.S. PATENT DOCUMENTS

| | | | |
|---|---|---|---|
| 2,281,477 | 4/1942 | Chesny | 106/58 |
| 2,313,746 | 3/1943 | Heany | 106/58 |
| 3,295,937 | 1/1967 | Leschen | 106/62 X |
| 3,979,216 | 9/1976 | Fritsch et al. | 106/62 |
| 4,063,955 | 12/1977 | Fritsch et al. | 106/62 X |

*Primary Examiner*—Edward J. Meros
*Attorney, Agent, or Firm*—John C. Fox

[57] ABSTRACT

Synthetic cordierite ($2MgO.2Al_2O_3.5SiO_2$) ceramic bodies exhibiting high strength and low thermal expansion are produced by (1) pelletizing talc, clay and alumina in a ratio to yield a nearly stoichiometric composition, (2) sintering the pellets to form cordierite, (3) milling the pellets in non-contaminating media to about 1 to 10 microns particle size, (4) consolidating the particles, and (5) sintering to a polycrystalline body. Such bodies possess good to excellent thermal shock resistance, and are useful, for example, as components in gas turbine engines.

10 Claims, No Drawings

METHOD FOR PRODUCING HIGH STRENGTH LOW EXPANSION CORDIERITE BODIES

TECHNICAL FIELD

This invention relates to a method for producing a synthetic cordierite polycrystalline ceramic body having low thermal expansion, and high mechanical strength.

BACKGROUND ART

The attractiveness of ceramics as materials for components of high temperature engines is widely recognized. The heat exchanger is an important part of gas turbine engine designs, since it recovers waste heat losses and preheats incoming air in order to improve engine efficiency. Both fuel consumption and exhaust emissions are minimized. Heat exchangers for furnace waste heat recovery are also receiving increased attention. Ceramic heat exchangers have the advantage of high temperature capability and corrosion resistance and are lighter in weight and potentially lower in cost than superalloy materials.

Ceramic materials which have been considered for use as heat exchanger materials are lithia-alumina-silica (LAS) and magnesia-alumina-silica (MAS) ceramics because of their low thermal expansion coefficients and correspondingly high thermal shock resistance. At present, MAS materials appear to exhibit better chemical durability than LAS materials under engine operating environments. Recent efforts have been directed to the lowering of the thermal expansion coefficients of MAS bodies in order to optimize thermal shock resistance. In U.S. Pat. No. 3,979,216, issued Sept. 7, 1976, and assigned to the present assignee, there is described a cordierite body having a microstructure characterized by the presence of intentionally introduced microcracks. In U.S. Pat. No. 4,063,955, issued Dec. 20, 1977, and assigned to the present assignee, a low expansion cordierite body is produced from a glass frit. While both of these approaches have been successful in producing low expansion cordierite bodies, a method has been sought which does not depend upon the introducton of microcracks, which could lead to lower than desired mechanical strength, or upon the presence of glassy material, incomplete crystallization of which could increase thermal expansion to undersirably high levels.

DISCLOSURE OF THE INVENTION

In accordance with the invention, synthetic cordierite polycrystalline ceramic bodies having compositions centering around the $2MgO.2Al_2O_3.5SiO_2$ composition, and having low thermal expansion and high mechanical strength, are produced by a method including the steps of: (1) pelletizing a mixture of crystalline raw materials such as the minerals talc, clay, and a starting material which on firing will yield $Al_2O_3$, in the desired proportions to achieve upon firing a cordierite composition within the range of about 13 to 16 percent by weight MgO, 30 to 36 weight percent $Al_2O_3$ and 49 to 54 weight percent $SiO_2$; (2) firing these pellets under conditions to form cordierite; (3) reducing the particle size of the pellets to within the range of about 1 to 10 microns average particle size; (4) consolidating the particles into a green body; and (5) sintering the body to form a polycrystalline cordierite body. The resulting body possesses low thermal expansion, good mechanical strength, and good thermal shock resistance, as well as acceptable chemical durability, thermal stability, and is useful, for example, as a heat exchanger material in high temperature engines.

BEST MODE FOR CARRYING OUT THE INVENTION

For a better understanding of the present invention, together with other and further objects, advantages and capabilities thereof, reference is made to the following disclosure and appended claims in connection with the above-description of some of the aspects of the invention.

Starting materials may be the minerals talc, a clay such as ball clay and a reactive form of alumina, such such as alpha $Al_2O_3$, although starting materials may be any mixture of synthetic powders or naturally occurring minerals formulated to give an approximately stoichiometric cordierite composition, that is, the 2:2:5 composition, upon heating to sintering temperatures. The presence of impurities which tend to lower the melting point of the reactants to stabilize a glass phase, or to impede crystallization in some other way are detrimental to obtaining the desired low thermal expansion coefficient of the body. Particularly detrimental in this regard is calcium. As little as a few hundred parts per million of calcium effectively increases thermal expansion several hundred parts per million. Permissible ranges of impurities are as follows: the alkaline earths calcium, strontium and barium should be kept below 600 parts per million total, and preferably below about 300 parts per million total, and each alkaline earth should be kept below about 200 parts per million and preferably below about 100 parts per million; the alkali metals lithium, sodium and potassium should be kept below about 6,000 parts per million total, and preferably below about 3,000 parts per million total; iron should be kept below about 0.5 weight percent; titanium below about 1 weight percent and preferably below about 0.5 weight percent.

An addition which is volatilized at or before sintering temperature, such as one or more of the conventional organic binders, plasticizers or other forming aids, may be added prior to pelletizing and/or formation of the green body. Such additives are well-known and are unnecessary to an understanding of this invention. Examples of such additives and their function in the MAS system are listed in Table I.

TABLE I

| Material | | Function |
| --- | --- | --- |
| Carbowax | (Polyethyleneglycol) | Binder |
| Methocel | (Methylcellulose) | Binder |
| Gelvatol | (Polyvinylalcohol) | Binder |
| TEG | (Triethyleneglycol) | Plasticizer |
| Ethyleneglycol | | Plasticizer |
| Glycerine | | Plasticizer |
| Darvan C | | Dispersant |
| Darvan 7 | | Dispersant |
| Dispex A-40 | | Dispersant |

Starting materials are chosen and proportioned to achieve a final sintered ceramic composition within the range of about 13 to 16 weight percent MgO, 30 to 36 weight percent $Al_2O_3$ and 49 to 54 weight percent $SiO_2$. These starting materials are mixed and pelletized to pellets within the range of about 1/64 to ⅛ inch average diameter. A preferred method for producing such pellets is to fill a Waring blender about ½ full of powder, starting the blender and slowly adding water until pellets form.

The pellets are then substantially converted to cordierite by sintering at a temperature within the range of about 1350° to 1450° C. for a time of about ½ to 6 hours in an atmosphere of Air. In order to form a nearly 100% cordierite composition within the pellets it is preferred to carry out the above heat treatment within the narrower range of about 1400° C. to 1410° C. for about 1 to 2 hours. The thus formed pellets are then reduced in particle size by milling in non-contaminating milling media, such as $Al_2O_3$, in order to maintain acceptable impurity levels. Such milling is typically carried out in ball mills with alumina media for a time within the range of about 10 to 48 hours, resulting in a surface area of about 5 to 10 square meters per gram, as determined by BET analysis, corresponding to an average particle size within the range of about 1 to 10 microns.

The starting materials as minerals or compounds which undergo thermal decomposition prior to reaching sintering temperatures may optionally be subjected to a presintering or calcining step either prior to mixing of the starting materials or prior to pelletizing the starting material mixtures, in accordance with standard practice in the ceramic arts.

The high surface area material obtained from the milling of the cordierite pellets is then consolidated into a final desired shape, together with any desired forming aids, such as binders or plasticizers, by any of the conventional ceramic forming techniques such as dry pressing, extruding, slip casting, isostatic pressing, or injection molding, followed by sintering the consolidated green ceramic body at a temperature within the range about 1350° C. to 1450° C. for at least about ½ to 6 hours in an air atmosphere. In order to achieve optimum final sintered properties, the sintering should be carried out within the narrower preferred range of about 1390° to 1410° C. for a time of from about 1 to 2 hours. Carrying out sintering within the above ranges will achieve a substantially crystalline or polycrystalline synthetic cordierite body, which is substantially free of glassy material which if present, would have a deleterious effect upon the thermal expansion coefficient of the body. As used herein, the terms "crystalline" and "polycrystalline" describe a solid composed of atoms, ions, or molecules arranged in a pattern which is repetitive in three dimensions and exhibits distinct x-ray diffraction intensity peaks characteristics of the crystal structure, while "glassy" or "amorphous" means a short range order solid indicated by its lack of x-ray diffraction intensity peaks and by broad infra-red absorption peaks.

While there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

Cordierite ceramic bodies produced by the method of the invention possess high strength, low thermal expansion, and good to excellent thermal shock resistance, and are useful, for example, as components for gas turbine engines, or as industrial heat recuperators.

I claim:

1. A method for producing a polycrystalline cordierite ceramic body of magnesium aluminum silicate having the composition in weight percent within the range of about 13 to 16 weight percent MgO, 30 to 36 weight percent $Al_2O_3$ and 49 to 54 percent $SiO_2$, the method comprising: (a) pelletizing a mixture of talc, clay and alpha alumina which upon sintering will yield a composition within the above weight percent range, (b) firing the pellets to form a substantial amount of cordierite therein; (c) reducing the fired pellets to an average particle size within the range of about 1 to 10 microns; (d) consolidating the particles into a green body; and (e) sintering the compact to form a substantially cordierite polycrystalline ceramic body.

2. The method of claim 1 wherein pelletizing results in pellets having an average size within the range of about 1/64 inch to ⅛ inch.

3. The method of claim 1 wherein firing of the pellets is carried out within the range of about 1350° C. to 1450° C. for about ½ to 6 hours in an air atmosphere.

4. The method of claim 3 wherein such firing is carried out within the range of 1400° C. to 1410° C. for about 1 to 2 hours.

5. The method of claim 1 wherein the pellets are reduced in particle size by milling the pellets in non-contaminating media.

6. The method of claim 5 wherein such milling is carried out in $Al_2O_3$ ball mills with $Al_2O_3$ media for a time of from about 10 to 48 hours.

7. The method of claim 1 wherein the green body is sintered at a temperature within the range of about 1350° C. to 1450° C. for at least about ½ to 6 hours in an air atmosphere.

8. The method of claim 7 wherein such sintering is carried out at a temperature within the range of 1390° C. to 1410° C. for from about 1 to 2 hours.

9. The method of claim 1 wherein prior to pelletizing, one or more volatilizable additives are added to the mixture to aid in pelletizing.

10. The method of claim 1 wherein prior to consolidation, the reduced particles are mixed with a volatilizable additive to aid in consolidation.

* * * * *